(12) United States Patent
Chaffin

(10) Patent No.: US 6,402,228 B1
(45) Date of Patent: Jun. 11, 2002

(54) MOVEABLE SALT SHIELD FOR SNOWMOBILE TRAILER

(76) Inventor: Stanley C. Chaffin, 643 N. Westlawn Ave., Aurora, IL (US) 60506

( * ) Notice: Subject to any disclaimer, the term of this patent is extended or adjusted under 35 U.S.C. 154(b) by 0 days.

(21) Appl. No.: 09/871,021

(22) Filed: May 31, 2001

(51) Int. Cl.[7] .................................................. B60J 1/00
(52) U.S. Cl. ..................................... 296/180.4; 296/182
(58) Field of Search ........................... 296/180.4, 180.1, 296/157, 181, 182; 280/847, 770, 760, 414, 1; 114/361

(56) References Cited

U.S. PATENT DOCUMENTS

| | | | |
|---|---|---|---|
| 3,560,013 A | | 2/1971 | Lee |
| 3,653,677 A | | 4/1972 | Feser |
| 3,726,423 A | * | 4/1973 | Miron |
| 4,051,967 A | * | 10/1977 | Sedgwick |
| 4,157,200 A | | 6/1979 | Johnson |
| D288,419 S | * | 2/1987 | Read et al. ............ D12/106 |
| 4,934,302 A | | 6/1990 | Harper |
| D356,058 S | | 3/1995 | Newton |
| 5,487,586 A | | 1/1996 | Kinkaide |
| 5,558,486 A | * | 9/1996 | Paproski ............... 414/537 |
| 5,762,374 A | | 6/1998 | Grove et al. |
| 6,092,856 A | | 7/2000 | Ladensack |
| 6,113,116 A | * | 9/2000 | Stanton et al. ........ 280/24 |
| 6,152,784 A | * | 10/2000 | Rehel et al. ........... 114/361 |

* cited by examiner

Primary Examiner—Joseph D. Pape
(74) Attorney, Agent, or Firm—Mathew R. P. Perrone, Jr.

(57) ABSTRACT

A movable salt shield for a snowmobile trailer has a shield plate mounted on an extension arm, the extension being mounted on pivoting device, thereby allowing for the shield plate to be the moved from the front to the rear of a snowmobile trailer and back again.

19 Claims, 4 Drawing Sheets

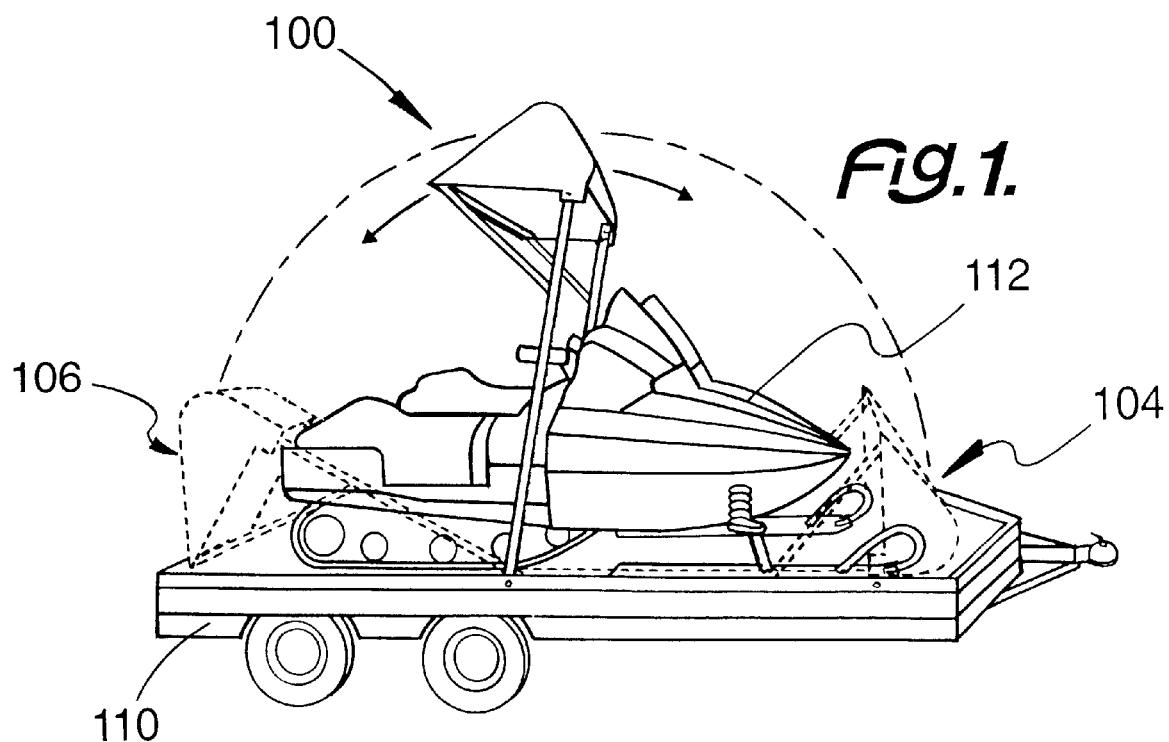
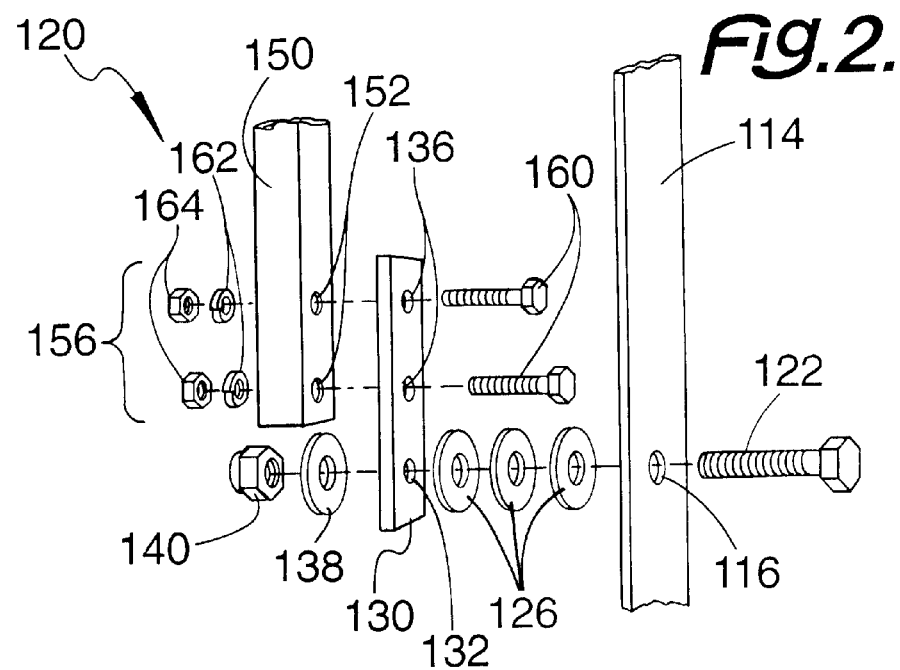

MOVEABLE SALT SHIELD FOR SNOWMOBILE TRAILER

This invention relates to a salt shield for a snowmobile trailer, in more particularly to a moveable salt shield for a snowmobile trailer.

BACKGROUND OF THE INVENTION

A snowmobile provides a valuable outlet for winter sports and safety activities. A snowmobile permits access to snow-covered areas. It also permits access to movement in snow storms. The snow mobile can pass through heavy snowfalls and provide for transportation in times of emergencies or actual entertainment.

However, it is sometimes difficult to get a snowmobile from place to place. Customarily, snowmobiles are placed on a trailer and towed to an appropriate place in preparation for using the same. In towing, a snowmobile on an exposed trailer suffers the same damage as any vehicle on the road. Salt and other undesirable material can contact the snowmobile being towed, and cause damage thereto. It is desirable to prevent this damage in any suitable fashion.

To that end, a variety of salt shields have been developed. These shields attach to the front of the trailer and prevent the elements from road debris from contacting the snowmobile. These guards are effective in protecting the snowmobile.

However, such a guard may interfere with the use of the trailer. By placing the guard on the trailer, access to the trailer is reduced. The trailer must be put in a certain position in order to unload the snowmobile. Also, the snowmobile must avoid the guard. Furthermore, the guard can sometimes inhibit access to the snowmobile, while the snowmobile is on the trailer. It is desirable to have the protection of the guard while at the same time providing good access to both the snowmobile and the trailer. No acceptable device for accomplishing these goals currently exists.

SUMMARY OF THE INVENTION

Among the many objectives of this invention is the provision of a movable salt shield for a snowmobile trailer.

Another objective of this invention is to provide a movable salt shield for a snowmobile trailer, which provides access to the snowmobile.

Yet another objective of this invention is to provide a movable salt shield for a snowmobile trailer, which is easily attached to an existing snowmobile trailer.

Still, another objective of this invention is to provide a movable salt shield for a snowmobile trailer added thereto during manufacture.

Additionally, an objective of this invention is to provide a movable salt shield for a snowmobile trailer which is movable from one end of the trailer to the other.

Also, an objective of this invention is to provide a movable salt shield for a snowmobile trailer with minimized interference with access to the snowmobile.

A still further objective of this invention is to provide a movable salt shield for a snowmobile trailer adapted to receive a support for the salt shield.

These and other objectives of the invention (which other objectives become clear by consideration of the specification, claims and drawings as a whole) are met by providing a movable salt shield for a snowmobile trailer, the movable salt shield for a snowmobile trailer including a shield plate mounted on extension arms capable of pivoting the shield from the front to the rear of the snowmobile trailer.

BRIEF DESCRIPTION OF DRAWINGS

FIG. 1 depicts a perspective view of the movable salt shield 100 of this invention in position on a trailer 110 for carrying a snowmobile 112.

FIG. 2 depicts an exploded perspective view of the connecting assembly 120 for the movable salt shield 100.

Throughout the figures of the drawings where the same part appears in more than one figure, the same number is applied thereto.

DESCRIPTION OF PREFERRED EMBODIMENTS

Figure 3:
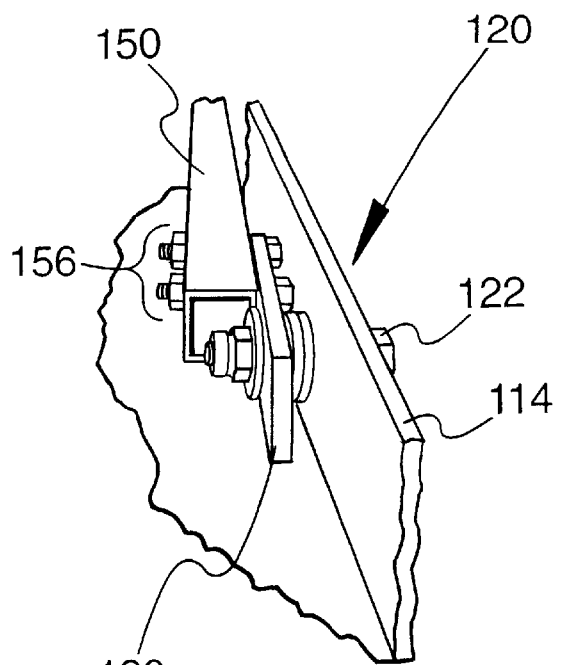
FIG. 3 depicts an assembled, rear, perspective view of the connecting assembly 120 for the movable salt shield 100.

A movable salt shield for a snowmobile trailer can be accomplished by mounting a standard shield plate for a snowmobile trailer on an arm assembly, which fastens together. The arm assembly is mounted on the trailer and provides for movement of the shield plate. With arm assembly, the shield plate may be moved from the front of the trailer, where the tongue or vehicle attaching point for the trailer is situated, to the rear of the trailer; or held at points therebetween.

Preferably, the arm assembly includes mounting apertures, which align with other apertures in adjacent pieces of the arm assembly, thereby providing an ability for the arm assembly to be attached to the snowmobile trailer. A series of apertures in the mounting poles provides for adjustability due to parts of the mounting poles being to nest together or telescope together. Securing of the nesting poles or telescoping poles is accomplished with any suitable fastener; such as a nut, washer and bolt assembly; or a cotter pin assembly; glue or welding. A clevis pin is a typical cotter pin assembly.

The mounting poles may be made of any suitable material, such as steel, aluminum, reinforced plastic or the like In a preferred form, the mounting poles are made out of aluminum and have a square cross-section. These aluminum poles are nestable and adjustable in line thanks to a series of apertures in the poles and a pinning mechanism, which cooperate with the apertures. With the pinning mechanisms, the length of the pole can be adjusted in the attachment of the snowmobile guard to the snowmobile trailer. With the pinning or series apertures, one basic arm assembly can be adapted to a variety of snowmobile trailers.

Connection for the parts of the movable salt shield can be accomplished with any suitable fastener. Nut and bolt assemblies, or cotter pin assemblies are preferred. Other parts and fasteners may be used herein in view of this disclosure.

Referring now to FIG. 1, snowmobile trailer 110 has movable salt shield 100 mounted thereon. As the movable salt shield 100 is raised, access to snowmobile 112 is permitted from either end of snowmobile trailer 110. In the same fashion, snowmobile 112 may be loaded or unloaded from either end of snowmobile trailer 110. More particularly, movable salt shield 100 has standard front position 104, but is movable to rear position 106, when desired.

Adding FIG. 2 to the consideration, side rail 114 of snowmobile trailer 110 has a rail aperture 116 therein. Connecting or arm assembly 120 is mounted on pivot bolt 122. Pivot bolt 122 passes through rail aperture 116. Any number of desired spacer washers 126 are placed over pivot bolt 122. Also, over pivot bolt 122 and spacer washers 126 is placed pivot plate 130. Pivot plate 130 includes a pivot plate aperture 132 in order to receive pivot bolt 122. Pivot bolt 122 and pivot plate 130 cooperate to permit movement between standard front position 104 and rear position 106 (FIG. 1).

Onto pivot bolt 122 and adjacent to pivot plate 130 may be placed bolt washer 138. Pivot bolt 122 may then be secured with pivot nut 140. Thus, pivot plate 130 provides one of a pair of pivot plates 130, the pair of pivot plates 130 cooperating to permit movement of movable salt shield 100.

Pivot plate 130 includes at least a pair of plate apertures 136. To the pivot plate 130 is secured extension arm 150. Extension arm 150 has a pair of arm apertures 152 adapted to align with the pair of plate apertures 136 and receive a nut and bolt assembly 156. Nut and bolt assembly 156 includes a pair of arm bolts 160 adapted to pass through arm aperture 152 and plate aperture 136. Arm bolt 160 receives a lock washer 162 and a cover nut 164.

Figure 4:
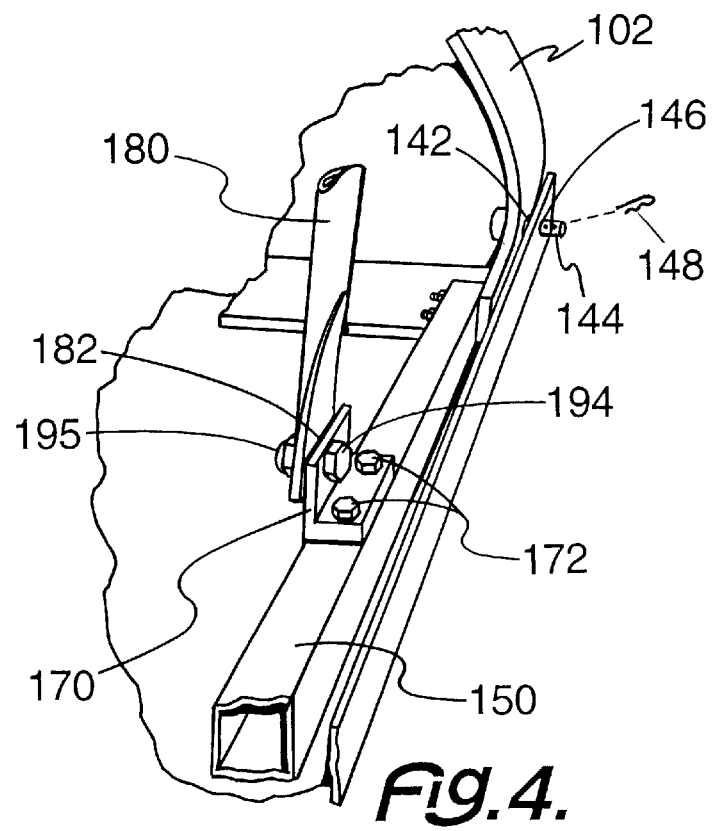
FIG. 4 depicts a perspective view of the extension arm 150 for the connecting assembly 120 used with the movable salt shield 100.

Adding FIG. 4 to the consideration, angle bracket 170 is mounted on extension arm 150. Angle bracket 170 is a right angle bracket secured to support bar 180 and secured to extension arm 150 with a pair of brace bolts 172. Angle bracket 170 is fastened to extension arm 150. Angle bracket 170 is thus attached to support bar 180, with bolt 194 through bracket aperture 182 and bar aperture 184, nut 195 on support bolt 194. At the opposing end of support bar 180 shield plate 102 is secured thereto.

Optionally in FIG. 4, shield plate 102 may include clevis open aperture 142. With a clevis pin 144 in both clevis open aperture 142 and clevis pin receiving aperture 146, the clevis pin receiving aperture 146 being situated in trailer side rail 114, clevis pin 144 is secured with a cotter pin 148, and thereby secures movable salt shield 100 in a desired position. Another suitable locking device may replace clevis pin 144 if desired.

Figure 5:
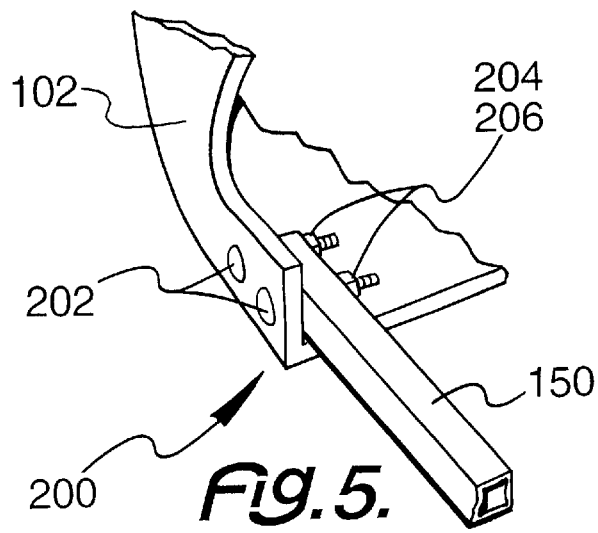
FIG. 5 depicts an inside perspective view of the extension arm 150 for the movable salt shield 100.

Adding FIG. 5 to the consideration, extension arm 150 is fastened or otherwise secured to shield plate 102 in order to form movable salt shield 100, when taken in conjunction with connecting assembly 120 (FIG. 3). Preferably, shield fastening assembly 200 includes at least one each of a carriage bolt 202, a lock washer 204 and a nut 206, assembled in a standard fashion to complete the assembly.

Figure 6:
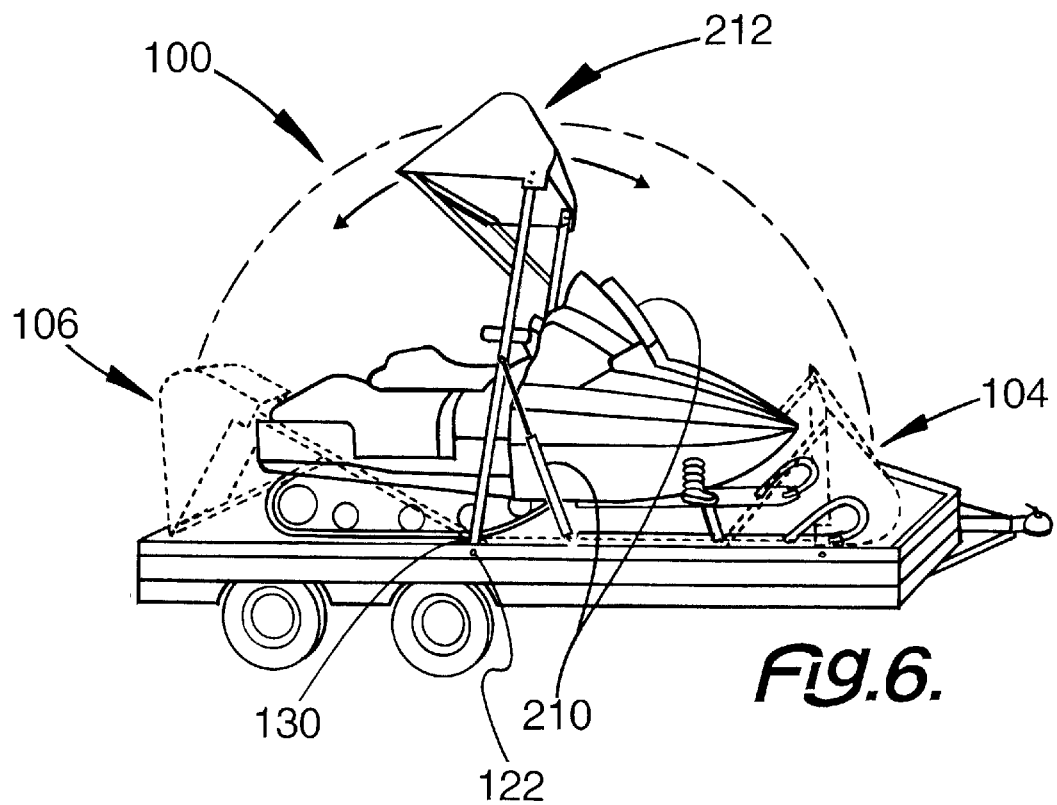
FIG. 6 depicts a perspective view of the movable salt shield 100 of this invention based on FIG. 1 with the addition of hydraulic arms 210.

With FIG. 6, hydraulic arms 210 are added to FIG. 1, in order to permit a supported stop point 212, in cooperation with pivot bolt 122 and pivot plate 130 movement between standard front position 104 and rear position 106. With the supported stop point 212, movable salt shield 100 may be positioned upwardly and provide access to snowmobile 112 from either end of trailer 110. Hydraulic arms 210 are mounted by bolting, pinning or other standard fashion.

Figure 7:
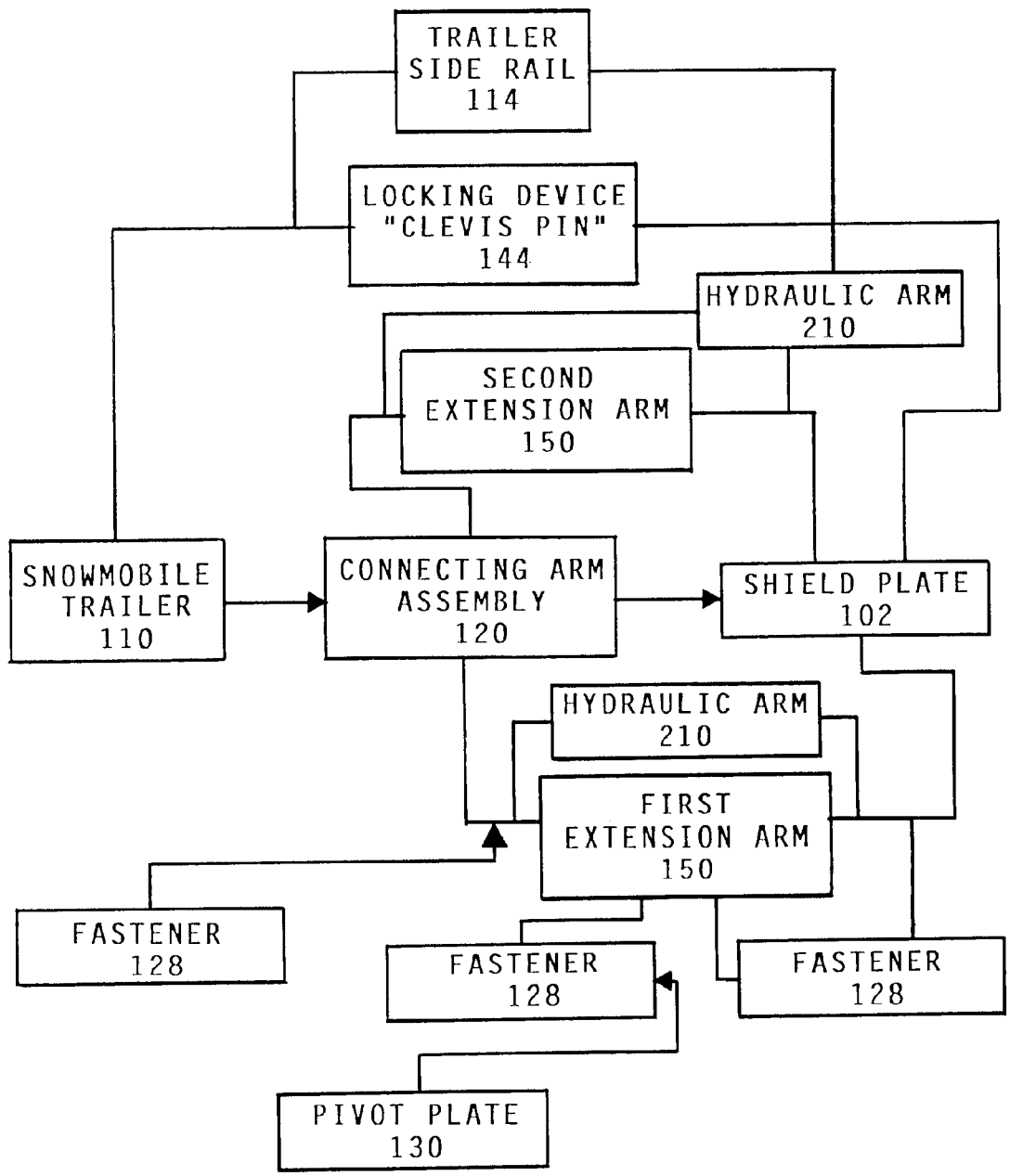
FIG. 7 depicts a block diagram for the. assembly of movable salt shield 100 of this invention.

Adding FIG. 7 to the consideration, the structure of movable salt shield 100 is depicted in block diagram form. Many different types of fasteners 128 may be used to assemble the movable salt shield 100 as shown herein. Snowmobile trailer 110 has a connecting arm assembly 120 joining the shield plate 102 to the side rail 114 of the snowmobile trailer 110, thereby rendering shield plate 102 movable relative to the snowmobile trailer 114.

Connecting arm assembly 120, with first arm 150 and second arm 150 connecting to shield plate 102, also connects to trailer side rail 114. If desired, first arm 150 and second arm 150 include the pivot plate 130 connecting extension arm 150 to the trailer side rail 114. Various types of fasteners 128 accomplish this goal.

Fasteners 128 may be of any suitable type, including but not limited to, nut and bolt assemblies, cotter pin assemblies, welding, and glue. Thus, fasteners 128 include, but not limited to, pivot bolt 122, spacer washers 126, bolt washer 138, pivot nut 140, clevis pin 144, and cotter pin 148. Fasteners 128 may also secure hydraulic arms 210 in the proper position. Thus, a variety of fasteners and assemblies may be used to form movable salt shield 100. A preferred assembly is set forth in FIG. 1, FIG. 2, FIG. 3, FIG. 4, and FIG. 5.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by letters patent of the united states is:

1. In a snowmobile trailer having a shield plate mounted thereon to protect a snowmobile being transported thereon, the improvement comprising:

(a) an arm assembly being attachable to the shield plate;

(b) the arm assembly being attachable to the snowmobile trailer;

(c) the arm assembly having at least two attaching means;

(d) the at least two attaching means for the arm assembly providing for an adjustment so that the shield may be adapted to the snowmobile trailer; and (e) the arm assembly having a pivot device in order for the shield to be moved from the front of the snowmobile trailer to the rear of the snowmobile trailer.

2. The snowmobile trailer having a shield plate mounted thereon of claim 1, the improvement further comprising:

(a) the snowmobile trailer having a first side rail and a second side rail; and (b) the first side rail and the second side rail cooperating to receive the arm assembly.

3. The snowmobile trailer having a shield plate mounted thereon of claim 2, the improvement further comprising:

(a) the arm assembly including a first pivot plate and a second pivot plate;

(b) the first pivot plate being adapted for mounting to the first side rail;

(c) the second pivot plate being adapted for mounting to the second side rail;

(d) the arm assembly including a first extension arm and a second extension arm;

(e) the first extension arm being attachable to the first pivot plate; and (f) the second extension arm being attachable to the second pivot plate.

4. The snowmobile trailer having a shield plate mounted thereon of claim 3, the improvement further comprising:
    (a) the first extension arm being similar in structure to the second extension arm;
    (b) the first extension arm being attachable to a first side of the shield plate; and
    (c) the second extension arm being attachable to a second side of the shield plate.

5. The snowmobile trailer having a shield plate mounted thereon of claim 4, the improvement further comprising:
    (a) a first angle bracket being attached to the first extension arm;
    (b) a second angle bracket being attached to the second extension arm;
    (c) a first support bar being connected to the first angle bracket and the first side of the shield plate;
    (d) a second support bar being connected to the second angle bracket and the second side of the shield plate; and
    (e) the first support bar and the first extension arm cooperating with the second support bar and to the second extension arm in order to support the shield plate.

6. The snowmobile trailer having a shield plate mounted thereon of claim 5, the improvement further comprising:
    (a) a first hydraulic arm being attachable to the first side rail and the first extension arm;
    (b) a second hydraulic arm being attachable to the second side rail and the second extension arm; and
    (c) the first hydraulic arm and the second hydraulic arm being adapted to support the shield plate.

7. A snowmobile trailer having a shield plate mounted thereon to protect a snowmobile being transported thereon comprising:
    (a) an arm assembly being attachable to the shield plate;
    (b) the arm assembly being attachable to the snowmobile trailer;
    (c) the arm assembly having at least two attaching means;
    (d) the at least two attaching means for the arm assembly providing for an adjustment in order for the shield to be adapted to the snowmobile trailer; and
    (e) the arm assembly having a pivot device in order for the shield to be moved from the front of the snowmobile trailer to the rear of the snowmobile trailer;
    (f) the snowmobile trailer having a first side rail and a second side rail; and
    (g) the arm assembly being movably secured to the first side rail and the second side rail.

8. The snowmobile trailer of claim 7 further comprising:
    (a) the arm assembly including a first pivot plate and a second pivot plate;
    (b) the first pivot plate being adapted for mounting to the first side rail;
    (c) the second pivot plate being adapted for mounting to the second side rail;
    (d) the arm assembly including a first extension arm and a second extension arm;
    (e) the first extension arm being attachable to the first pivot plate; and
    (f) the second extension arm being attachable to the second pivot plate.

9. The snowmobile trailer of claim 8 further comprising:
    (a) the first extension arm being similar in structure to the second extension arm;
    (b) the first extension arm being attachable to a first side of the shield plate; and
    (c) the second extension arm being attachable to a second side of the shield plate.

10. The snowmobile trailer of claim 9 further comprising:
    (a) a first angle bracket being attached to the first extension arm;
    (b) a second angle bracket being attached to the second extension arm;
    (c) a first support bar being connectable to the first extension arm and the first side of the shield plate;
    (d) a second support bar being connectable to the second extension arm and the second side of the shield plate; and
    (e) the first support bar and the first extension arm cooperating with the second support bar and to the second extension arm in order to support the shield plate.

11. The snowmobile trailer of claim 10 further comprising:
    (a) a first hydraulic arm being attachable to the first side rail and the first extension arm;
    (b) a second hydraulic arm being attachable to the second side rail and the second extension arm; and
    (c) the first hydraulic arm and the second hydraulic arm being adapted to support the shield plate.

12. The snowmobile trailer of claim 11 further comprising:
    (a) the first pivot plate being secured to the first side rail with a first pivot bolt;
    (b) the second pivot plate being secured to the second side rail with a second pivot bolt;
    (c) the first arm assembly at least partially rotating on the first pivot bolt; and
    (d) the second arm assembly at least partially rotating on the second pivot bolt.

13. The snowmobile trailer of claim 12 further comprising:
    (a) the first hydraulic arm being adapted to support the first arm assembly;
    (b) the second hydraulic arm being adapted to support the second arm assembly; and
    (c) the shield plate being supportable in an upright position.

14. The snowmobile trailer of claim 13 further comprising:
    (a) the pivot bolt having at least one spacer washer mounted thereon;
    (b) a pivot bolt being secured to the pivot plate; and
    (c) the first pivot plate and the second pivot plate having at least two plate apertures.

15. The snowmobile trailer of claim 14 further comprising:
    (a) the first pivot plate and the first arm assembly receiving at least a first nut and bolt assembly;
    (b) the second pivot plate and the second arm assembly receiving at least a second nut and bolt assembly;
    (c) the first angle bracket supporting the first support bar; and
    (d) the second angle bracket supporting the second support bar.

16. The snowmobile trailer of claim 15 further comprising:
   (a) a pair of arm bolts being adapted to pass through the arm apertures and plate apertures;
   (b) the pair of arm bolts each having a lock washer and a cover nut;
   (c) a first clevis open aperture being situated in the first side of the shield plate;
   (d) a second clevis open aperture being situated in the second side of the shield plate;
   (e) a first clevis pin receiving aperture being situated in the first side rail;
   (f) a second clevis pin receiving aperture being situated in the second side rail;
   (g) the first clevis open aperture being alignable with the first clevis pin receiving aperture;
   (h) the second clevis open aperture being alignable with the second clevis pin receiving aperture;
   (i) a first clevis pin being simultaneously mountable in the first clevis open aperture and the first clevis pin receiving aperture; and
   (j) a second clevis pin being simultaneously mountable in the second clevis open aperture and the second clevis pin receiving aperture.

17. The snowmobile trailer of claim 16 further comprising:
   (a) the snowmobile trailer being loadable or unloadable from a front of the snowmobile trailer or a rear of the snowmobile trailer; and
   (b) the shield plate being movable.

18. The snowmobile trailer of claim 16 further comprising the pivot plate being secured to the extension arm with a nut and bolt assembly.

19. The snowmobile trailer of claim 16 further comprising the pivot plate being secured to the side rail with a nut and bolt assembly.

* * * * *